United States Patent
Lee et al.

(10) Patent No.: US 12,185,235 B2
(45) Date of Patent: Dec. 31, 2024

(54) SELECTING DESTINATION BASED ON HARQ FEEDBACK

(71) Applicant: LG ELECTRONICS INC., Seoul (KR)

(72) Inventors: Youngdae Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 17/753,277

(22) PCT Filed: Oct. 29, 2020

(86) PCT No.: PCT/KR2020/014900
§ 371 (c)(1),
(2) Date: Feb. 25, 2022

(87) PCT Pub. No.: WO2021/086047
PCT Pub. Date: May 6, 2021

(65) Prior Publication Data
US 2022/0408350 A1    Dec. 22, 2022

(30) Foreign Application Priority Data
Oct. 29, 2019    (KR) .................. 10-2019-0135806

(51) Int. Cl.
*H04W 48/18*    (2009.01)
*H04W 72/23*    (2023.01)
*H04W 92/18*    (2009.01)

(52) U.S. Cl.
CPC .......... *H04W 48/18* (2013.01); *H04W 72/23* (2023.01); *H04W 92/18* (2013.01)

(58) Field of Classification Search
CPC ..... H04W 48/18; H04W 72/23; H04W 92/18; H04W 28/0252; H04W 72/569; H04L 2001/0093; H04L 1/1685; H04L 1/1854
See application file for complete search history.

(56) References Cited

U.S. PATENT DOCUMENTS 11,838,936 B2 * 12/2023 Kung ................. H04W 72/54
2017/0366311 A1    12/2017 Iyer et al.
(Continued)

FOREIGN PATENT DOCUMENTS

| CN | 107079530 | 8/2017 |
| CN | 110383933 | 10/2019 |
| WO | 2017-171527 | 10/2017 |

OTHER PUBLICATIONS

PCT International Application No. PCT/KR2020/014900, International Search Report dated Jan. 29, 2021, 2 pages.
(Continued)

*Primary Examiner* — Habte Mered
(74) *Attorney, Agent, or Firm* — LEE, HONG, DEGERMAN, KANG & WAIMEY

(57) ABSTRACT

A method and apparatus for selecting a destination based on hybrid automatic repeat request (HARQ) feedback in a wireless communication system is provided. A first wireless device selects a destination, from multiple destinations, having a first logical channel with a highest priority among multiple logical channels having data available for transmission. The HARQ feedback is disabled for the first logical channel. The first wireless device selects one or more second logical channels not configured with the HARQ feedback among the multiple logical channels.

14 Claims, 13 Drawing Sheets

(56) References Cited

U.S. PATENT DOCUMENTS

| | | | |
|---|---|---|---|
| 2019/0014564 A1 | 1/2019 | Lee et al. | |
| 2020/0367095 A1* | 11/2020 | Pan | H04L 1/1874 |
| 2021/0105126 A1* | 4/2021 | Yi | H04L 1/1671 |
| 2021/0105743 A1* | 4/2021 | Lin | H04W 72/02 |
| 2021/0153065 A1* | 5/2021 | Adjakple | H04W 76/14 |
| 2022/0007231 A1* | 1/2022 | Basu Mallick | H04W 28/0289 |
| 2022/0053464 A1* | 2/2022 | Yu | H04W 72/04 |
| 2022/0158776 A1* | 5/2022 | Kang | H04L 1/1685 |
| 2022/0182979 A1* | 6/2022 | Freda | H04W 72/56 |
| 2022/0224438 A1* | 7/2022 | Park | H04W 72/0446 |
| 2022/0224454 A1* | 7/2022 | Yu | H04L 1/1896 |

OTHER PUBLICATIONS

Huawei et al., "Remaining issues on sidelink LCP procedure," R2-1913711, 3GPP TSG-RAN WG2 #107bis, Oct. 2019, 9 pages.

Spreadtrum Communications, "Logical channel prioritization Consideration," R2-1912234, 3GPP TSG-RAN WG2 Meeting #107bis, Oct. 2019, 5 pages.

Nomor Research GmbH, "HARQ process selection and logical channel prioritization," R2-1912698, 3GPP TSG-RAN WG2 Meeting #107bis, Oct. 2019, 6 pages.

Nokia et al., "Discussion on LCP procedure for NTN," R2-1913388, 3GPP TSG-RAN WG2 Meeting #107bis, Oct. 2019, 7 pages.

3rd Generation Partnership Project, "Technical Specification Group Radio Access Network; Evolved Universal Terrestrial Radio Access (E-UTRA); Medium Access Control (MAC) protocol specification (Release 15)," Sections 5.14.1.1, 5.14.1.2, and 5.14.1.3 of 3GPP TS 36.321 V15.7.0, Sep. 2019, 134 pages.

The State Intellectual Property Office of the People's Republic of China Application Serial No. 202080074620.3, Office Action dated May 2, 2023, 4 pages.

* cited by examiner

SELECTING DESTINATION BASED ON HARQ FEEDBACK

CROSS-REFERENCE TO RELATED APPLICATIONS

This application is the National Stage filing under 35 U.S.C. 371 of International Application No. PCT/KR2020/014900, filed on Oct. 29, 2020, which claims the benefit of earlier filing date and right of priority to Korean Application No. 10-2019-0135806 filed on Oct. 29, 2019, the contents of which are all hereby incorporated by reference herein in their entireties.

TECHNICAL FIELD

The present disclosure relates to selecting a destination based on hybrid automatic repeat request (HARQ) feedback.

BACKGROUND 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G). SUMMARY An aspect of the present disclosure is to provide a method and apparatus for selecting a destination based on whether a first logical channel with a highest priority is configured with HARQ feedback or not.

Another aspect of the present disclosure is to provide a method and apparatus for performing logical channel prioritization (LCP) for the selected destination.

In an aspect, a method performed by a first wireless device configured to operate in a wireless communication system is provided. The method includes selecting a destination, from multiple destinations, having a first logical channel with a highest priority among multiple logical channels having data available for transmission, wherein the HARQ feedback is disabled for the first logical channel, and selecting one or more second logical channels not configured with the HARQ feedback among the multiple logical channels.

In another aspect, an apparatus for implementing the above method is provided.

The present disclosure can have various advantageous effects.

For example, when radio resources are classified according to whether HARQ feedback is configured or not, and data is to be transmitted towards multiple destinations, an appropriate destination can be selected and data can be transmitted within a limited resource.

For example, a UE performing HARQ operation by using the highest priority of the selected logical channels can properly enable or disable HARQ feedback for transmissions of the packet by considering logical channel configuration.

For example, a UE performing HARQ operation can perform logical channel prioritization when different logical channels are configured with and/or without HARQ feedback.

For example, the system can provide HARQ feedback for data transmissions for a UE performing HARQ operation.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
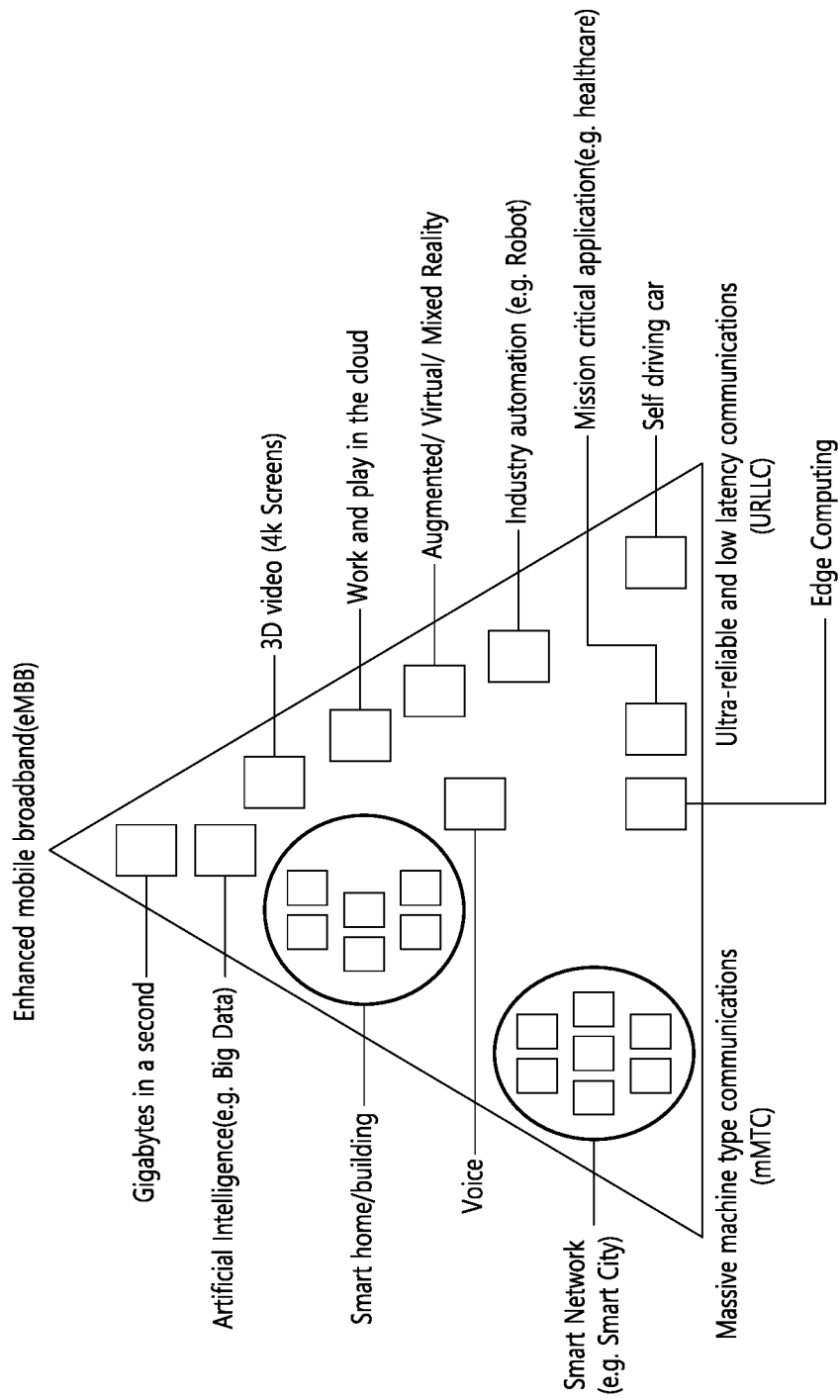
FIG. 1 shows examples of 5G usage scenarios to which the technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink (DL) and SC-FDMA in uplink (UL). LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
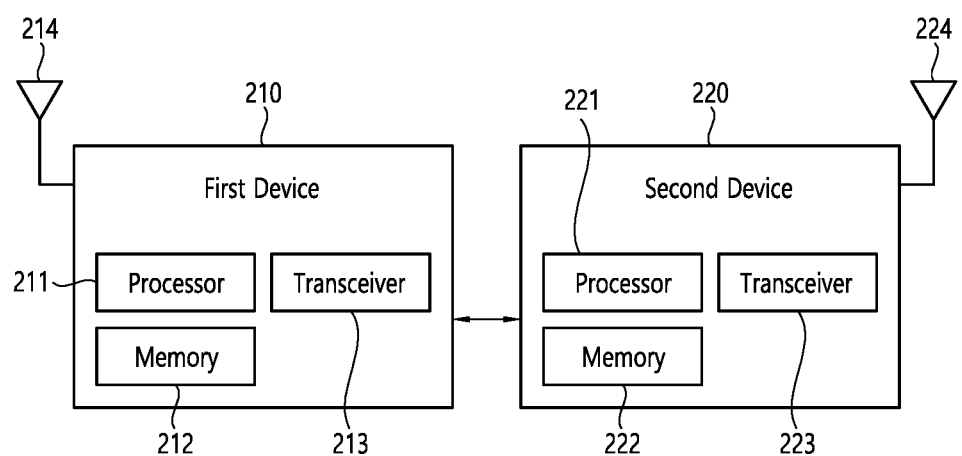
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
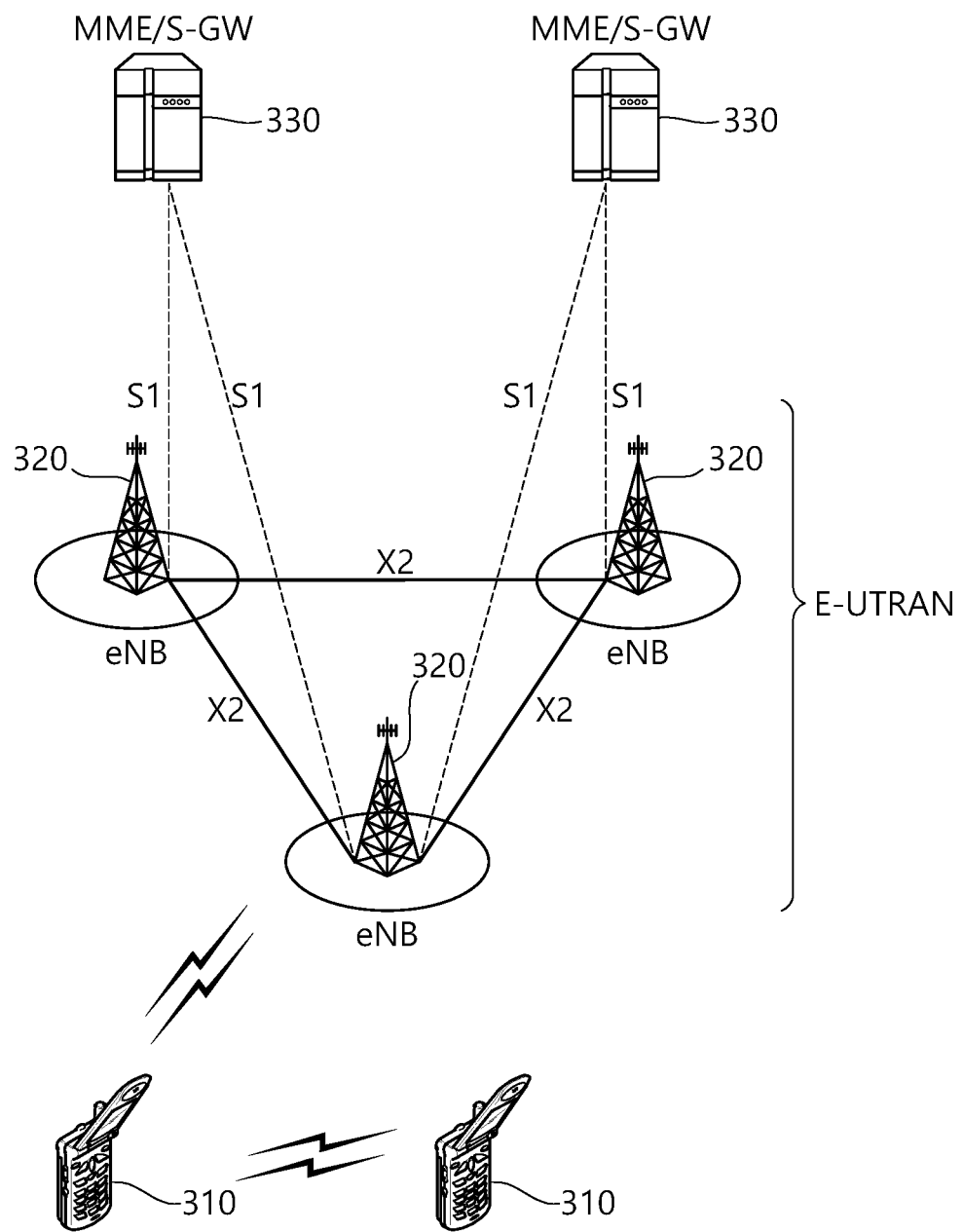
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
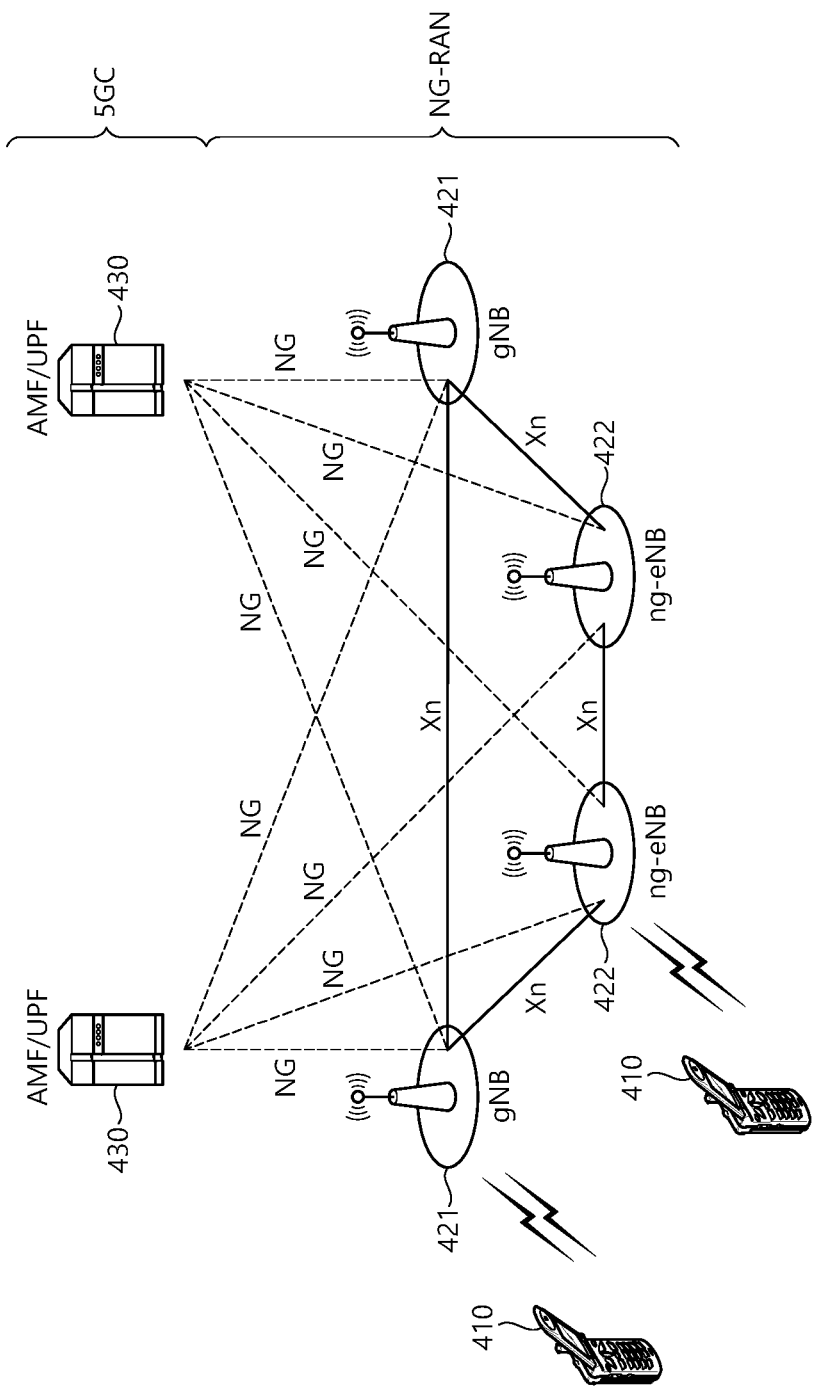
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 5:
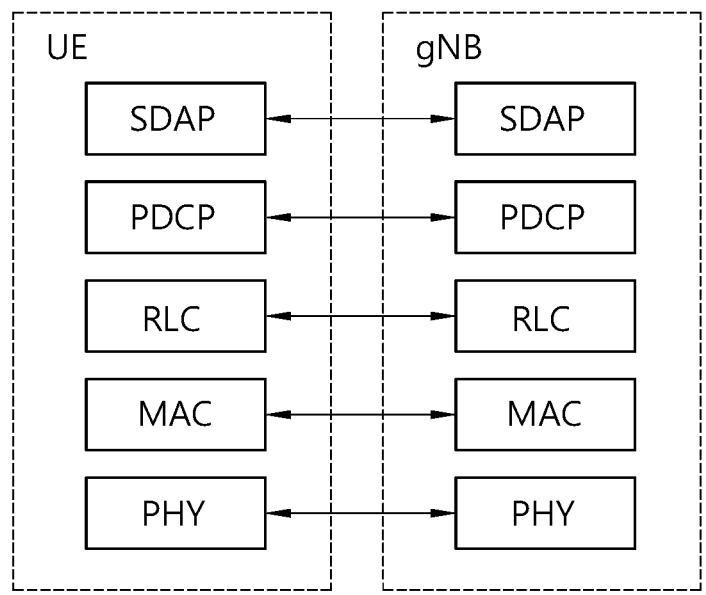
FIG. 5 shows a block diagram of a user plane protocol stack to which the technical features of the present disclosure can be applied.
Figure 6:
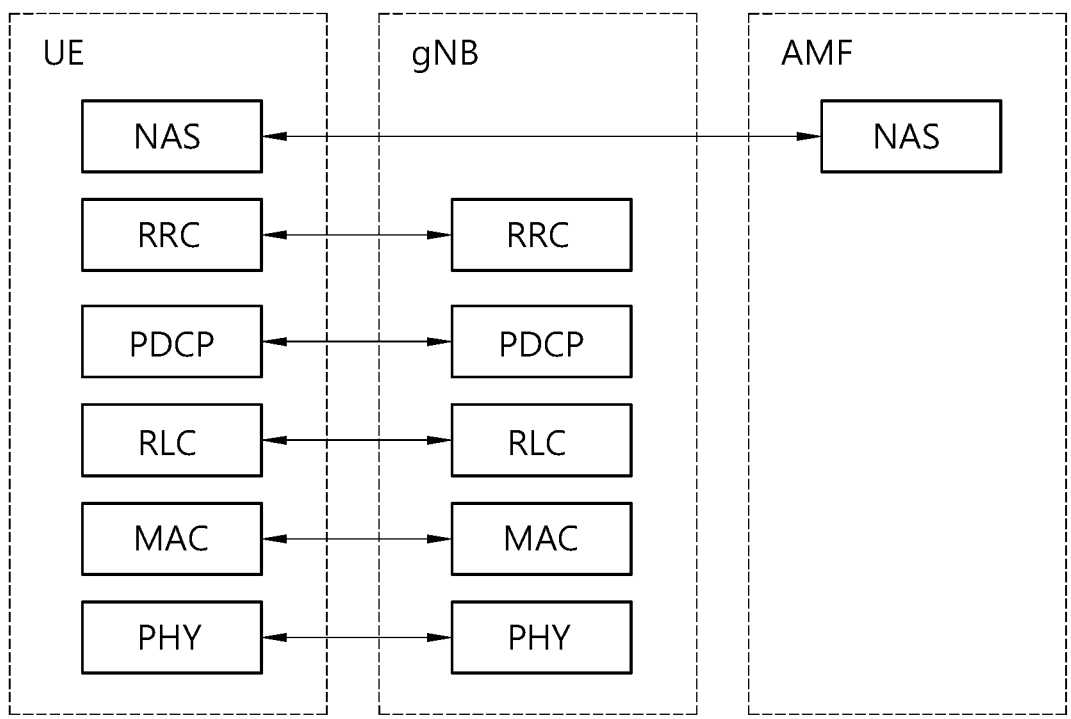
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
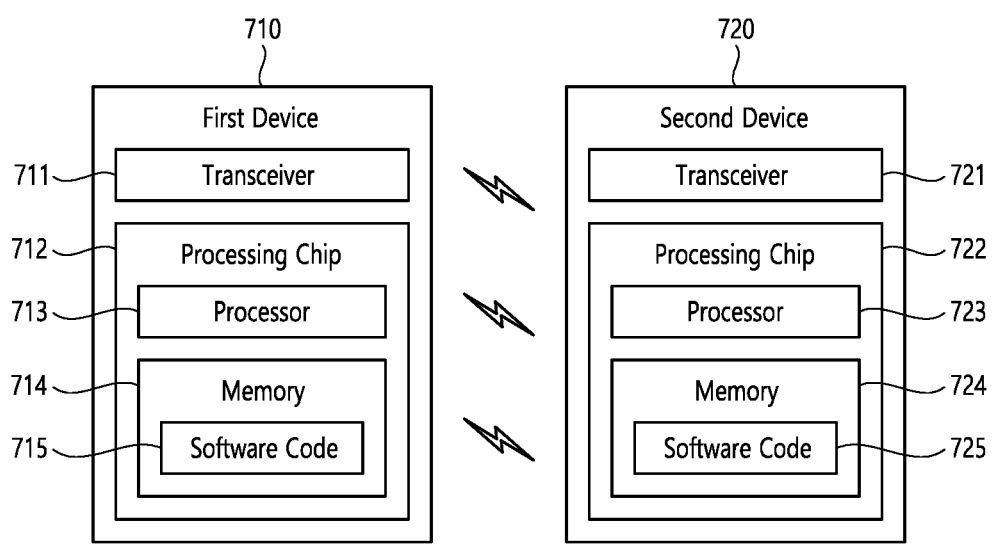
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
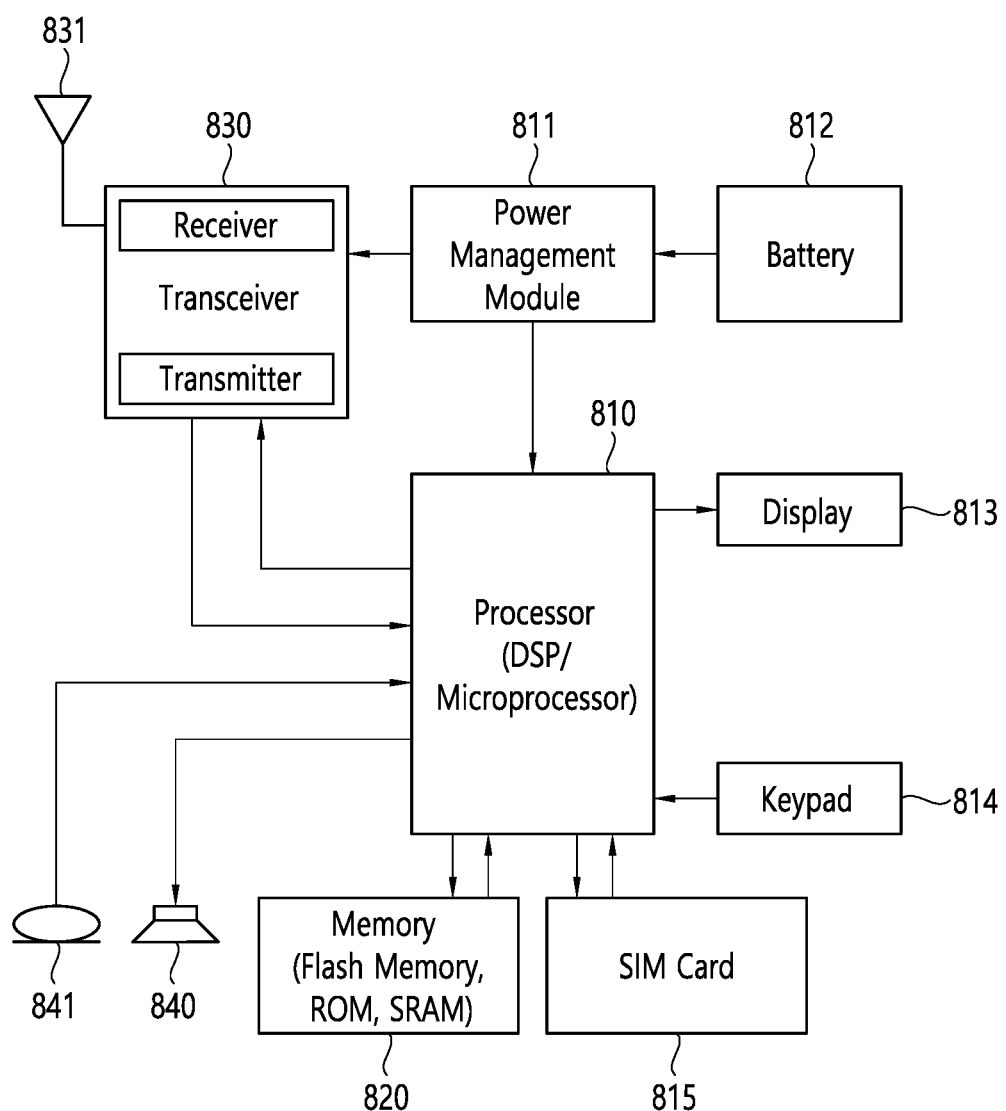
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

Sidelink (SL) grant reception and sidelink control information (SCI) transmission is described. Section 5.14.1.1 of 3GPP TS 36.321 V15.7.0 can be referred.

In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current sidelink control (SC) period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant occurring in the same SC period, if available;

2> clear the configured sidelink grant at the end of the corresponding SC period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC period which starts at least 4 subframes after the subframe in which the sidelink grant was selected;

2> clear the configured sidelink grant at the end of the corresponding SC period;

Retransmissions on SL-SCH cannot occur after the configured sidelink grant has been cleared.

Sidelink grants are selected as follows for vehicle-to-everything (V2X) sidelink communication:

1> if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

2> use the received sidelink grant to determine the number of HARQ retransmissions and the set of subframes in which transmission of SCI and SL-SCH occur;

2> consider the received sidelink grant to be a configured sidelink grant for the carrier;

1> if the MAC entity is configured by upper layers to receive a sidelink grant on the PDCCH addressed to SL semi-persistent scheduling (SPS) V2X radio network temporary identity (V-RNTI), the MAC entity shall for each SL SPS configuration and for each carrier configured in sl-V2X-ConfigDedicated for which a sidelink grant has been received on the PDCCH addressed to SL semi-persistent scheduling V-RNTI for this TTI:

2> if PDCCH contents indicate SPS activation:

3> use the received sidelink grant to determine the number of HARQ retransmissions and the set of subframes in which transmission of SCI and SL-SCH occur;

3> consider the received sidelink grant to be a configured sidelink grant for the carrier.

2> if PDCCH contents indicate SPS release:

3> clear the corresponding configured sidelink grant for the carrier.

1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each sidelink process configured for multiple transmissions:

2> if there is no configured sidelink grant associated with the sidelink process on any carrier allowed for the STCH as indicated by upper layers:

3> trigger the TX carrier (re-)selection procedure as specified below;

2> else if there is a configured sidelink grant associated with the sidelink process:

3> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed modulation and coding scheme (MCS) configured by upper layers in maxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated ProSe-per-packet priority (PPPP), and the MAC entity selects not to perform transmission(s) corresponding to a single MAC PDU; or 3> if the pool of resources where the sidelink grant is configured for the sidelink process, is reconfigured by upper layers:

4> trigger the TX carrier (re-)selection procedure as specified below;

4> clear the configured sidelink grant associated to the sidelink process;

4> flush the HARQ buffer associated to the sidelink process;

3> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

4> clear the configured sidelink grant, if available;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> use the previously selected sidelink grant for the number of transmissions of the MAC PDUs with the resource reservation interval to determine the set of subframes in which transmissions of SCI and SL-SCH occur;

4> consider the selected sidelink grant to be a configured sidelink grant;

2> if the TX carrier (re-)selection procedure was triggered in above and one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select one of the allowed values configured by upper layers in restrictResourceReservationPeriod and set the resource reservation interval by multiplying 100 with the selected value;

4> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the channel busy ratio (CBR) measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity from the resources indicated by the physical layer, according to the amount of selected frequency resources. The selected time and frequency resources shall fulfil the physical layer requirements, and the random function shall be such that each of the allowed selections can be chosen with equal probability;

4> use the randomly selected resource to select a set of periodic resources spaced by the resource reservation interval for transmission opportunities of SCI and SL-SCH corresponding to the number of transmission opportunities of MAC PDUs;

4> if the number of HARQ retransmissions is equal to 1:

5> if there are available resources left in the resources indicated by the physical layer that meet the conditions for more transmission opportunities:

6> randomly select the time and frequency resources for one transmission opportunity from the available resources, according to the amount of selected frequency resources. The selected time and frequency resources shall fulfil the physical layer requirements, and the random function shall be such that each of the allowed selections can be chosen with equal probability;

6> use the randomly selected resource to select a set of periodic resources spaced by the resource reservation interval for the other transmission opportunities of SCI and SL-SCH corresponding to the number of retransmission opportunities of the MAC PDUs;

6> consider the first set of transmission opportunities as the new transmission opportunities and the other set of transmission opportunities as the retransmission opportunities;

6> consider the set of new transmission opportunities and retransmission opportunities as the selected sidelink grant.

4> else:

5> consider the set as the selected sidelink grant;

4> use the selected sidelink grant to determine the set of subframes in which transmissions of SCI and SL-SCH occur;

4> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a sidelink process:

2> trigger the TX carrier (re-)selection procedure as specified below;

2> if one or more carriers have been (re-)selected in the Tx carrier (re-)selection:

3> determine the order of the (re-)selected carriers, according to the decreasing order based on the highest priority of logical channels which are allowed on each (re-)selected carrier, and perform the following for each Sidelink process on each (re-)selected carrier according to the order:

4> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

4> randomly select the time and frequency resources for one transmission opportunity of SCI and SL-SCH from the resources indicated by the physical layer, according to the amount of selected frequency resources. The selected time and frequency resources shall fulfil the physical layer requirement, and the random function shall be such that each of the allowed selections can be chosen with equal probability;

4> if the number of HARQ retransmissions is equal to 1:
5> if there are available resources left in the resources indicated by the physical layer that meet the conditions for one more transmission opportunity:
6> randomly select the time and frequency resources for the other transmission opportunity of SCI and SL-SCH corresponding to additional transmission of the MAC PDU from the available resources, according to the amount of selected frequency resources. The selected time and frequency resources shall fulfil the physical layer requirements, and the random function shall be such that each of the allowed selections can be chosen with equal probability;
6> consider a transmission opportunity which comes first in time as the new transmission opportunity and a transmission opportunity which comes later in time as the retransmission opportunity;
6> consider both of the transmission opportunities as the selected sidelink grant;
4> else:
5> consider the transmission opportunity as the selected sidelink grant;
4> use the selected sidelink grant to determine the subframes in which transmission(s) of SCI and SL-SCH occur];
4> consider the selected sidelink grant to be a configured sidelink grant.

For V2X sidelink communication, the UE should ensure the randomly selected time and frequency resources fulfill the latency requirement.

The MAC entity shall for each subframe:
1> for each configured sidelink grant occurring in this subframe:
2> if SL_RESOURCE_RESELECTION_COUNTER =1 for the sidelink process associated with the configured sidelink grant and the MAC entity randomly selected, with equal probability, a value in the interval [0, 1] which is above the probability configured by upper layers in probResourceKeep:
3> set the resource reservation interval for the configured sidelink grant equal to 0;
2> if the configured sidelink grant corresponds to transmission of SCI:
3> for V2X sidelink communication in UE autonomous resource selection:
4> consider the selected transmission format to be SL-V2X-TxProfile for the highest priority of the sidelink logical channel(s) in the MAC PDU;

4> select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers if CBR measurement results are available or the corresponding defaultTxConfigIndex configured by upper layers if CBR measurement results are not available;
3> for V2X sidelink communication in scheduled resource allocation:
4> consider the selected transmission format to be SL-V2X-TxProfile for the highest priority of the sidelink logical channel(s) in the MAC PDU;
4> select a MCS which is associated with the selected transmission format unless it is configured by upper layer;
3> instruct the physical layer to transmit SCI corresponding to the configured sidelink grant;
3> for V2X sidelink communication, deliver the configured sidelink grant, the associated HARQ information and the value of the highest priority of the sidelink logical channel(s) in the MAC PDU to the sidelink HARQ entity for this subframe;
2> else if the configured sidelink grant corresponds to transmission of first transport block for sidelink communication:
3> deliver the configured sidelink grant and the associated HARQ information to the sidelink HARQ entity for this subframe.

Sidelink HARQ operation is described. Section 5.14.1.2 of 3GPP TS 36.321 V15.7.0 can be referred.

The MAC entity is configured by upper layers to transmit using pool(s) of resources on one or multiple carriers. For each carrier, there is one sidelink HARQ entity at the MAC entity for transmission on SL-SCH, which maintains a number of parallel sidelink processes.

For V2X sidelink communication, the maximum number of transmitting sidelink processes associated with each sidelink HARQ entity is 8. A sidelink process may be configured for transmissions of multiple MAC PDUs. For transmissions of multiple MAC PDUs, the maximum number of transmitting sidelink processes associated with each sidelink HARQ entity is 2.

A delivered and configured sidelink grant and its associated HARQ information are associated with a sidelink process.

For each subframe of the SL-SCH and each sidelink process, the sidelink HARQ entity shall
1> if a sidelink grant corresponding to a new transmission opportunity has been indicated for this Sidelink process and there is SL data, for sidelink logical channels of ProSe destination associated with this sidelink grant, available for transmission:
2> obtain the MAC PDU from the "Multiplexing and assembly" entity;
2> deliver the MAC PDU and the sidelink grant and the HARQ information to this sidelink process;
2> instruct this sidelink process to trigger a new transmission.
1> else, if this subframe corresponds to retransmission opportunity for this sidelink process:
2> instruct this sidelink process to trigger a retransmission.

The sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant and with the MCS selected.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the sidelink HARQ entity requests a new transmission, the sidelink process shall:
1> set CURRENT_IRV to 0;
1> store the MAC PDU in the associated HARQ buffer;
1> store the sidelink grant received from the sidelink HARQ entity;
1> generate a transmission as described below.

If the sidelink HARQ entity requests a retransmission, the sidelink process shall:
1> generate a transmission as described below.

To generate a transmission, the sidelink process shall:
1> if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and
1> if there is no sidelink discovery gap for transmission or no transmission on physical sidelink discovery channel (PSDCH) at the time of the transmission; or, in case of transmissions of V2X sidelink communication, if the MAC entity is able to perform transmissions on SL-SCH and transmissions on PSDCH simultaneously at the time of the transmission:
2> instruct the physical layer to generate a transmission according to the stored sidelink grant with the redundancy version corresponding to the CURRENT_IRV value.
1> increment CURRENT_IRV by 1;
1> if this transmission corresponds to the last transmission of the MAC PDU:
2> decrement SL_RESOURCE_RESELECTION_COUNTER by 1, if available.

The transmission of the MAC PDU for V2X sidelink communication is prioritized over uplink transmissions if the following conditions are met:
if the MAC entity is not able to perform all uplink transmissions and all transmissions of V2X sidelink communication simultaneously at the time of the transmission; and
if uplink transmission is not prioritized by upper layer; and
if the value of the highest priority of the sidelink logical channel(s) in the MAC PDU is lower than thresSL-TxPrioritization if thresSL-TxPrioritization is configured.

Multiplexing and assembly is described. Section 5.14.1.3 of 3GPP TS 36.321 V15.7.0 can be referred.

For PDU(s) associated with one SCI, MAC shall consider only logical channels with the same Source Layer-2 ID-Destination Layer-2 ID pair.

Multiple transmissions within overlapping SC periods to different ProSe destinations are allowed subject to single-cluster SC-FDM constraint.

In V2X sidelink communication, multiple transmissions for different sidelink processes are allowed to be independently performed in different subframes.

The logical channel prioritization procedure is applied when a new transmission is performed. Each sidelink logical channel has an associated priority which is the PPPP and optionally an associated ProSe-per-packet reliability (PPPR). Multiple sidelink logical channels may have the same associated priority. The mapping between priority and LCID is left for UE implementation. If duplication is activated, the MAC entity shall map different sidelink logical channels which correspond to the same PDCP entity onto different carriers, or onto different carriers of different carrier sets (if configured in allowedCarrierFreqList for the corresponding destination). For a given sidelink logical channel, it is up to UE implementation which carrier set to select among the carrier sets configured in allowedCarrierFreqList (if configured) for the corresponding destination.

The MAC entity shall perform the following logical channel prioritization procedure either for each SCI transmitted in an SC period in sidelink communication, or for each SCI corresponding to a new transmission in V2X sidelink communication:
The MAC entity shall allocate resources to the sidelink logical channels in the following steps:
Only consider sidelink logical channels not previously selected for this SC period and the SC periods (if any) which are overlapping with this SC period, to have data available for transmission in sidelink communication;
Only consider sidelink logical channels which meet the following conditions:
allowed on the carrier where the SCI is transmitted for V2X sidelink communication, if the carrier is configured by upper layers;
having a priority whose associated threshCBRFreqReselection is no lower than the CBR of the carrier when the carrier is (re-)selected;
Only consider one sidelink logical channel among sidelink logical channels corresponding to same PDCP entity, if duplication is activated.
Step 0: Select a ProSe destination, having the sidelink logical channel with the highest priority, among the sidelink logical channels having data available for transmission and having the same transmission format as the one selected corresponding to the ProSe destination;
(NOTE: The sidelink logical channels belonging to the same ProSe Destination have the same transmission format.)
For each MAC PDU associated to the SCI:
Step 1: Among the sidelink logical channels belonging to the selected ProSe destination and having data available for transmission, allocate resources to the sidelink logical channel with the highest priority;
Step 2: if any resources remain, sidelink logical channels belonging to the selected ProSe destination are served in decreasing order of priority until either the data for the sidelink logical channel(s) or the SL grant is exhausted, whichever comes first. Sidelink logical channels configured with equal priority should be served equally.
The UE shall also follow the rules below during the scheduling procedures above:
the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data;

if the MAC entity is given a sidelink grant size that is equal to or larger than 10 bytes (for sidelink communication) or 11 bytes (for V2X sidelink communication) while having data available for transmission, the MAC entity shall not transmit only padding.

The MAC entity shall multiplex MAC SDUs in a MAC PDU.

In NR sidelink, HARQ feedback can be supported. That is, when a UE transmits a MAC PDU in sidelink, the UE may receive HARQ feedback for the MAC PDU in sidelink. Then, the UE may re-transmit the MAC PDU based on HARQ feedback, e.g., in case of negative acknowledgement (NACK).

For HARQ feedback, the MAC entity in the UE side may be informed whether a particular sidelink radio bearer (SLRB) is configured with HARQ feedback. In this case, how the UE creates a MAC PDU from multiple SLRBs for a valid sidelink grant is unclear. So, the UE cannot properly multiplex different logical channels into a MAC PDU for transmission and enable or disable HARQ feedback for the transmission.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
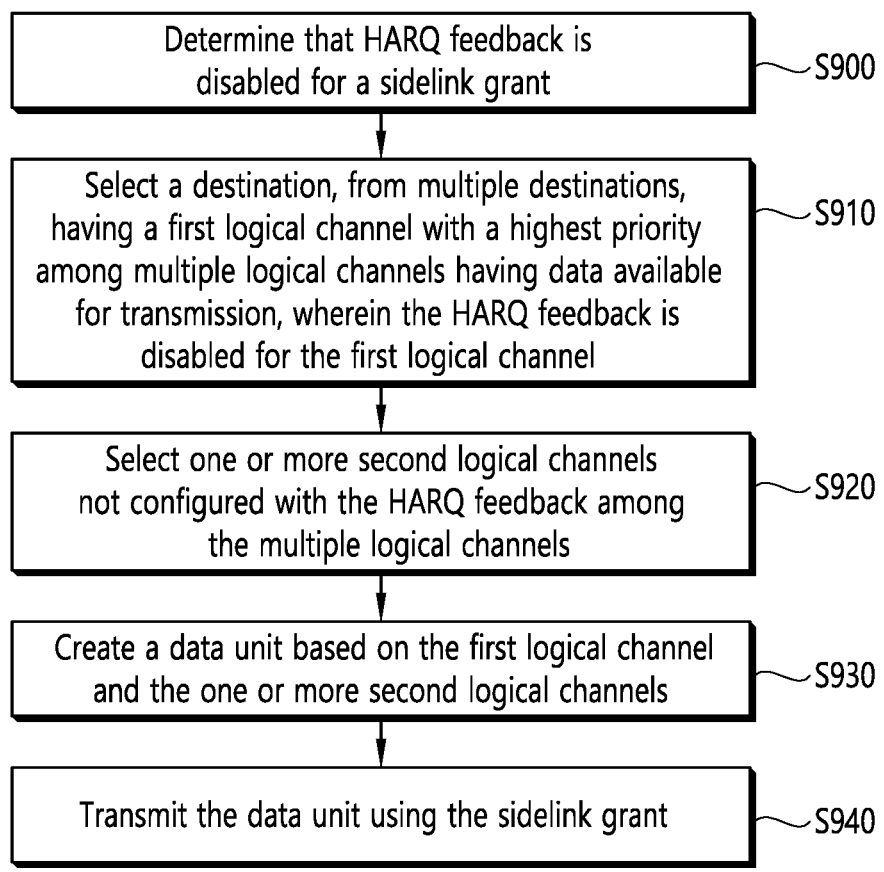
FIG. 9 shows an example of a method performed by a first wireless device (e.g., transmitting (TX) wireless device) to which the technical features of the present disclosure can be applied.

FIG. 9 shows an example of a method performed by a first wireless device (e.g., transmitting (TX) wireless device) to which the technical features of the present disclosure can be applied.

In step S900, the first wireless device determines that HARQ feedback is disabled for a sidelink grant.

In step S910, the first wireless device selects a destination, from multiple destinations, having a first logical channel with a highest priority among multiple logical channels having data available for transmission, wherein the HARQ feedback is disabled for the first logical channel.

In some implementations, the first logical channel with the highest priority may be selected for the selected destination.

In some implementations, a cast type associated with the destination is selected from among unicast, groupcast and/or broadcast.

In step S920, the first wireless device selects one or more second logical channels not configured with the HARQ feedback among the multiple logical channels.

In step S930, the first wireless device creates a data unit based on the first logical channel and the one or more second logical channels.

In step S940, the first wireless device transmits, to a second wireless device, the data unit using the sidelink grant.

In some implementations, the first logical channel and the one or more second logical channels may be associated with a SLRB.

In some implementations, a HARQ feedback resource may be requested to a network.

In some implementations, the data unit may be re-transmitted to the second wireless device without reception of the HARQ feedback from the second wireless device.

In some implementations, the first wireless device may be in communication with at least one of a mobile device, a network, and/or autonomous vehicles other than the first wireless device.

Furthermore, the method in perspective of the first wireless device described above in FIG. 9 may be performed by first device 210 shown in FIG. 2, the first device 710 shown in FIG. 7 and/or the UE shown in FIG. 8.

More specifically, the first wireless device comprises at least one transceiver, at least processor, and at least one computer memory operably connectable to the at least one processor and storing instructions that, based on being executed by the at least one processor, perform operations below.

The operations comprise determining that HARQ feedback is disabled for a sidelink grant.

The operations comprise selecting a destination, from multiple destinations, having a first logical channel with a highest priority among multiple logical channels having data available for transmission, wherein the HARQ feedback is disabled for the first logical channel.

In some implementations, the first logical channel with the highest priority may be selected for the selected destination.

In some implementations, a cast type associated with the destination is selected from among unicast, groupcast and/or broadcast.

The operations comprise selecting one or more second logical channels not configured with the HARQ feedback among the multiple logical channels.

The operations comprise creating a data unit based on the first logical channel and the one or more second logical channels.

The operations comprise transmitting, to a second wireless device, the data unit using the sidelink grant.

In some implementations, the first logical channel and the one or more second logical channels may be associated with a SLRB.

In some implementations, a HARQ feedback resource may be requested to a network.

In some implementations, the data unit may be re-transmitted to the second wireless device without reception of the HARQ feedback from the second wireless device.

Furthermore, the method in perspective of the first wireless device described above in FIG. 9 may be performed by control of the processor 211 included in the first device 210 shown in FIG. 2, by control of the processor 713 included in the first device 710 shown in FIG. 7 and/or by control of the processor 810 included in the UE shown in FIG. 8.

More specifically, an apparatus for configured to operate in a wireless communication system (e.g., first wireless device) comprises at least processor, and at least one computer memory operably connectable to the at least one processor. The at least one processor is configured to perform operations comprising determining that a hybrid automatic repeat request (HARQ) feedback is disabled for a sidelink grant, selecting a destination, from multiple destinations, having a first logical channel with a highest priority among multiple logical channels having data available for transmission, wherein the HARQ feedback is disabled for the first logical channel, selecting one or more second logical channels not configured with the HARQ feedback among the multiple logical channels, and creating a data unit based on the first logical channel and the one or more second logical channels.

Furthermore, the method in perspective of the first wireless device described above in FIG. 9 may be performed by a software code 715 stored in the memory 714 included in the first device 710 shown in FIG. 7.

More specifically, at least one computer readable medium (CRM) stores instructions that, based on being executed by at least one processor, perform operations comprising determining that a hybrid automatic repeat request (HARQ) feedback is disabled for a sidelink grant, selecting a destination, from multiple destinations, having a first logical channel with a highest priority among multiple logical channels having data available for transmission, wherein the HARQ feedback is disabled for the first logical channel, selecting one or more second logical channels not configured with the HARQ feedback among the multiple logical channels, and creating a data unit based on the first logical channel and the one or more second logical channels.

Figure 10:
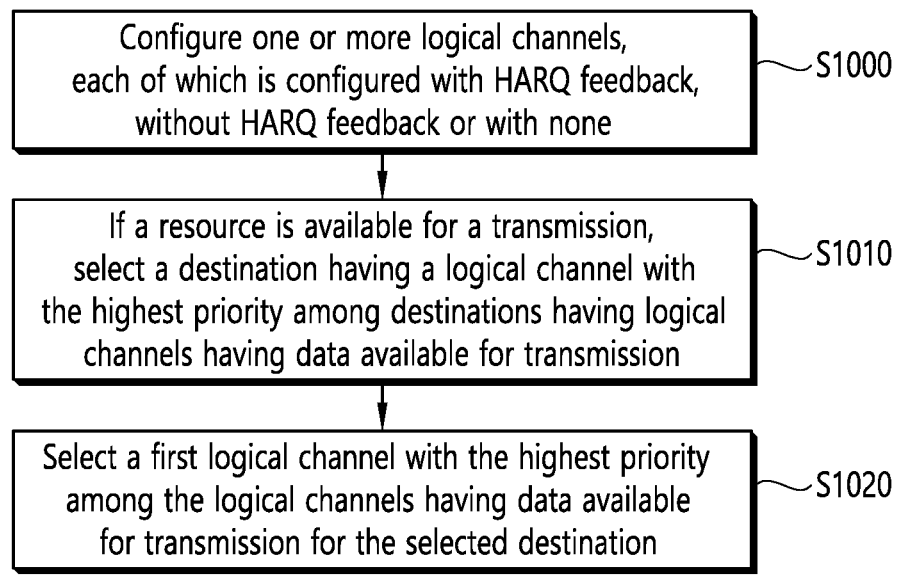
FIG. 10 shows an example of a method for performing data transmission by a UE to which the technical features of the present disclosure can be applied.

FIG. 10 shows an example of a method for performing data transmission by a UE to which the technical features of the present disclosure can be applied.

In step S1000, the UE configures one or more logical channels. Each of the one or more logical channels is configured with HARQ feedback, without HARQ feedback or with "none".

In some implementations, "none" means that the radio bearer can use either HARQ feedback or no HARQ feedback.

In some implementations, the one or more logical channels may be associated with a sidelink radio bearer.

In step S1010, if a resource is available for a transmission, the UE selects a destination having the logical channel with the highest priority among destinations having the logical channels having data available for transmission.

In some implementations, a cast type associated with the destination may also be selected from among unicast, groupcast and/or broadcast.

In some implementations, if the resource available for the transmission is associated with HARQ feedback, e.g., if feedback resource is available for the transmission resource, the logical channel with the highest priority may be configured with HARQ feedback or none.

In step S1020, the UE selects a first logical channel with the highest priority among the logical channels having data available for transmission for the selected destination.

In some implementations, the first logical channel may have data available for transmission.

In some implementations, if the first logical channel is configured with HARQ feedback or none, the UE may select one or more second logical channels with HARQ feedback or none, and construct a MAC PDU from the selected logical channels to transmit with HARQ feedback by using the resource.

In some implementations, if the first logical channel is configured without HARQ feedback or with none, the UE may select one or more second logical channels without HARQ feedback or with none, and construct a MAC PDU from the selected logical channels to transmit without HARQ feedback by using the resource.

Figure 11:
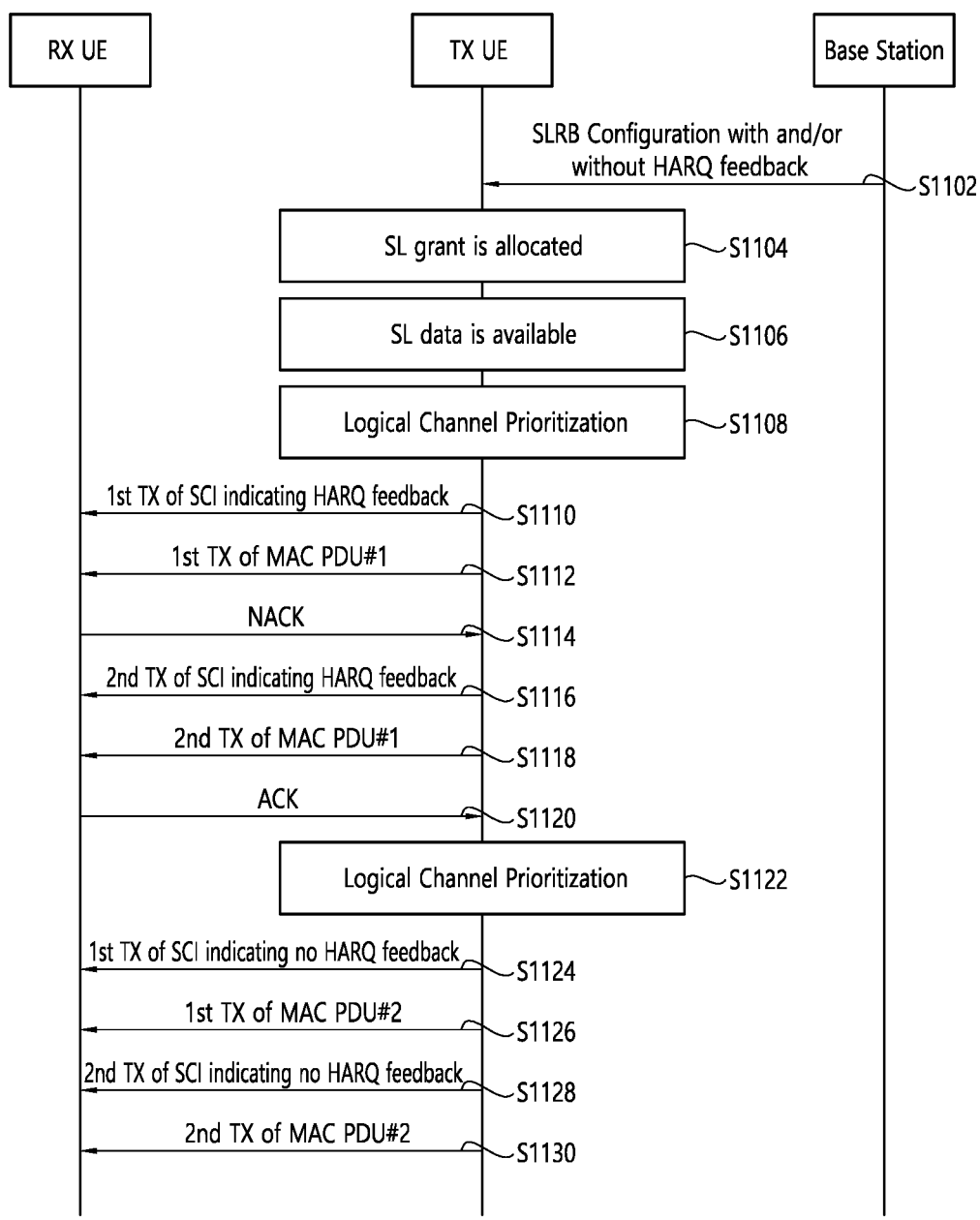
FIG. 11 shows an example of HARQ retransmission with or without HARQ feedback for sidelink data transmission of a MAC PDU from a TX UE to which the technical features of the present disclosure can be applied.

FIG. 11 shows an example of HARQ retransmission with or without HARQ feedback for sidelink data transmission of a MAC PDU from a TX UE to which the technical features of the present disclosure can be applied.

In step S1102, the TX UE configures one or more sidelink logical channels. Each of the one or more sidelink logical channels may be configured with HARQ feedback, without HARQ feedback or with "none".

"none" means that the radio bearer can use either HARQ feedback or no HARQ feedback.

The one or more logical channels may be associated with a sidelink radio bearer.

In step S1104, the TX UE allocates a set of resources for transmissions of one or more MAC PDUs on a carrier and considers the set of resources as a configured grant for a HARQ process.

The set of resources may be a set of NR resources.

The set of resources may be either sidelink resource or uplink resource.

The configured grant may be one of a configured sidelink grant, a configured grant Type 1 and a configured grant Type 2.

The TX UE may clear the resource (i.e., only part) of the configured sidelink grant associated to the HARQ process (e.g., sidelink process) for a carrier, if available.

In step S1106, SL data is available in a logical channel.

In step S1108, the TX UE performs logical channel prioritization.

In detail, if a resource is available for a transmission, the TX UE selects a destination having the logical channel with the highest priority among the destinations having the logical channels having data available for transmission. A cast type associated with the destination may also be selected from among unicast, groupcast and/or broadcast. If the resource available for the transmission is associated with HARQ feedback, e.g., if feedback resource is available for the transmission resource, the logical channel with the highest priority may be configured with HARQ feedback or none.

The TX UE selects a first logical channel with the highest priority among the logical channels having data available for transmission for the selected destination. The first logical channel may have data available for transmission.

It is assumed that the first logical channel is configured with HARQ feedback or none in step S1108, it. Accordingly, the TX UE selects one or more second logical channels with HARQ feedback or with none, and enables HARQ feedback for the resource.

In step S1110, the TX UE performs a first transmission of SCI indicating HARQ feedback to the RX UE.

In step S1112, the TX UE performs a first transmission of MAC PDU#1 to the RX UE.

The TX UE may construct a MAC PDU#1 by using one or more MAC SDUs from the first logical channel and/or the second logical channel(s) configured with HARQ feedback.

The TX UE may deliver the MAC PDU#1 to a HARQ process for which the TX UE performs transmission of the MAC PDU on the resource. Since HARQ feedback is enabled, the HARQ process is associated with HARQ feedback.

In step S1114, since HARQ feedback is indicated in step S1110 and the MAC PDU#1 is not successfully received, the RX UE transmits NACK for the MAC PDU#1 to the TX UE.

In step S1116, the TX UE performs a second transmission of SCI indicating HARQ feedback to the RX UE.

In step S1118, the TX UE performs a second transmission of MAC PDU#1 to the RX UE.

The TX UE may retransmit the MAC PDU#1 by using another resource from the HARQ process. If another resource does not support HARQ feedback, the TX UE may reconstruct a MAC PDU.

In step S1120, since HARQ feedback is indicated in step S1116 and the MAC PDU#1 is successfully received, the RX UE transmits ACK for the MAC PDU#1 to the TX UE.

In step S1122, the TX UE performs logical channel prioritization.

In detail, if a resource is available for a transmission, the TX UE selects a destination having the logical channel with the highest priority among the destinations having the logical channels having data available for transmission. A cast type associated with the destination may also be selected from among unicast, groupcast and/or broadcast. If the resource available for the transmission is associated with HARQ feedback, e.g., if feedback resource is available for the transmission resource, the logical channel with the highest priority may be configured with HARQ feedback or none.

The TX UE selects a first logical channel with the highest priority among the logical channels having data available for transmission for the selected destination. The first logical channel may have data available for transmission.

It is assumed that the first logical channel is not configured with HARQ feedback or none in step S1122, it. Accordingly, the TX UE selects one or more second logical channels without HARQ feedback or with none, and disables HARQ feedback for the resource.

If HARQ feedback is not configured with the resource and there is no other resource with HARQ feedback, the TX UE may request HARQ feedback resource to the network.

In step S1124, the TX UE performs a first transmission of SCI indicating no HARQ feedback to the RX UE.

In step S1126, the TX UE performs a first transmission of MAC PDU#2 to the RX UE.

The TX UE may construct a MAC PDU#2 by using one or more MAC SDUs from the first logical channel and/or the second logical channel(s) configured with HARQ feedback.

The TX UE may deliver the MAC PDU#2 to a HARQ process for which the TX UE performs transmission of the MAC PDU on the resource. Since HARQ feedback is disabled, the HARQ process is associated with no HARQ feedback.

Since no HARQ feedback is indicated in step S1124, even though the MAC PDU#2 is not successfully received, the RX UE does not transmit NACK for the MAC PDU#2 to the TX UE.

In step S1128, the TX UE performs a second transmission of SCI indicating no HARQ feedback to the RX UE.

In step S1130, the TX UE performs a second transmission of MAC PDU#2 to the RX UE.

The TX UE may retransmit the MAC PDU#2 by using another resource without reception of HARQ feedback from the RX UE.

For the sake of convenience, FIG. 11 shows sidelink data transmission, but this is only exemplary. Implementations of the present disclosure shown in FIG. 11 is not limited to the sidelink data transmission, but can also be applied to HARQ transmission and retransmissions of a MAC PDU in uplink as well. In this case, the RX UE in FIG. 11 can be replaced by the same or a different base station.

Furthermore, according to implementations of the present disclosure shown in FIG. 11, an example of a method performed by a RX UE (e.g., second wireless device) may be as follows.

The second wireless device receives, from a first wireless device, a data unit using a sidelink grant for which HARQ feedback is disabled. The data unit is created based on a first logical channel and one or more second logical channels. The first logical channel is a logical channel with a highest priority selected for a destination among multiple logical channels having data available for transmission. The HARQ feedback is disabled for the first logical channel. The one or more second logical channels are logical channels not configured with the HARQ feedback selected among the multiple logical channels.

Furthermore, the method in perspective of the second wireless device described above may be performed by second device 220 shown in FIG. 2, the second device 720 shown in FIG. 7 and/or the UE shown in FIG. 8.

More specifically, the second wireless device comprises at least one transceiver, at least processor, and at least one computer memory operably connectable to the at least one processor and storing instructions that, based on being executed by the at least one processor, perform operations comprising receiving, from a first wireless device, a data unit using a sidelink grant for which HARQ feedback is disabled. The data unit is created based on a first logical channel and one or more second logical channels. The first logical channel is a logical channel with a highest priority selected for a destination among multiple logical channels having data available for transmission. The HARQ feedback is disabled for the first logical channel. The one or more second logical channels are logical channels not configured with the HARQ feedback selected among the multiple logical channels.

According to implementations of the present disclosure, an example of operations of the MAC entity may be as follows.

For selection of logical channels based on HARQ feedback in LCP, the MAC entity shall for each SCI corresponding to a new transmission:

1> if HARQ feedback is enabled for the given SL grant:
  2> select a destination associated to one of unicast, groupcast and broadcast, having the logical channel with the highest priority, among the logical channels having data available for transmission,
  2> enable HARQ feedback for the SCI for the selected Destination;

HARQ feedback may be enabled for the logical channel with the highest priority for the Destination. Or, HARQ feedback may be enabled for all logical channels established for the destination. Or, HARQ feedback may be enabled for all logical channels of priorities above a threshold for the Destination.

If multiple destinations have the same highest priority, one of the destinations that has the logical channel with the highest priority and HARQ feedback set to enabled, among the logical channels having data available for transmission, or one of the destinations that has a logical channel with HARQ feedback set to enabled, among the logical channels having data available for transmission, may be selected.

1> else if HARQ feedback is disabled for the given SL grant:
  2> select a destination associated to one of unicast, groupcast and broadcast, having the logical channel with the highest priority, among the logical channels having data available for transmission,
  2> disable HARQ feedback for the SCI for the selected destination; HARQ feedback may be disabled for the logical channel with the highest priority for the destination. Or, HARQ feedback may be disabled for all logical channels established for the destination. Or, HARQ feedback may be disabled for all logical channels of priorities above a threshold for the destination.

If multiple destinations have the same highest priority, one of the destinations that has the logical channel with the highest priority and HARQ feedback set to disabled, among the logical channels having data available for transmission, or one of the destinations that has a logical channel with HARQ feedback set to disabled, among the logical channels having data available for transmission, may be selected.

1> else if HARQ feedback is neither enabled nor disabled for the given SL grant:

2> select a destination associated to one of unicast, groupcast and broadcast, having the logical channel with the highest priority, among the logical channels having data available for transmission, If multiple destinations have the same highest priority, one of the destinations that has the logical channel with the highest priority and HARQ feedback set to enabled, among the logical channels having data available for transmission, or one of the destinations that has a logical channel with HARQ feedback set to enabled, among the logical channels having data available for transmission, may be selected;

2> if a logical channel with the highest priority for the selected destination has data available for transmission and [HARQ feedback], if configured, is set to enabled or both for the logical channel by RRC, and if a physical sidelink feedback channel (PSFCH) resource is valid for the SCI; (or if a logical channel with the highest priority for the selected destination has data available for transmission and [HARQ feedback], if configured, is set to enabled or both for all logical channels of priorities above a threshold for the selected Destination by RRC, and if a PSFCH resource is valid for the SCI);

3> enable HARQ feedback for the SCI for the selected destination;

2> else:

3> disable HARQ feedback for the SCI for the selected destination;

1> select the logical channels for each SL grant that satisfy all the following condition:

2>[configuredSLGrantType1Allowed], if configured, is set to true in case the SL grant is a Configured Grant Type 1;

2>[HARQ feedback], if configured, is set to enabled or both in case the HARQ feedback is enabled for the SCI or the SL grant (or the selected logical channel with the highest priority having data available for transmission is configured for enabled or both);

2>[HARQ feedback], if configured, is set to disabled or both in case the HARQ feedback is disabled for the SCI or the SL grant (or the selected logical channel with the highest priority having data available for transmission is configured for disabled or both);

According to implementations of the present disclosure, another example of operations of the MAC entity may be as follows.

The MAC entity shall for each SCI corresponding to a new transmission:

1> select a destination associated to one of unicast, groupcast and broadcast, having at least one of the MAC CE and the logical channel with the highest priority, among the logical channels that satisfy all the following conditions and MAC control element(s), if any, for the SL grant associated to the SCI;

1> select the logical channels satisfying all the following conditions among the logical channels belonging to the selected destination:

2> SL data is available for transmission; and

2> sl-configuredGrantType1Allowed, if configured, is set to true in case the SL grant is a Configured Grant Type 1; and 2> sl-AllowedCG-List, if configured, includes the configured grant index associated to the SL grant; and 2> if PSFCH is configured for the sidelink grant associated to the SCI:

3> sl-HARQ-FeedbackEnabled is set to enabled, if sl-HARQ-FeedbackEnabled is set to enabled for the highest priority logical channel satisfying the above conditions; or 3> sl-HARQ-FeedbackEnabled is set to disabled, if sl-HARQ-FeedbackEnabled is set to disabled for the highest priority logical channel satisfying the above conditions.

2> else:

3> sl-HARQ-FeedbackEnabled is set to disabled.

The present disclosure may be applied to various future technologies, such as AI.

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 12:
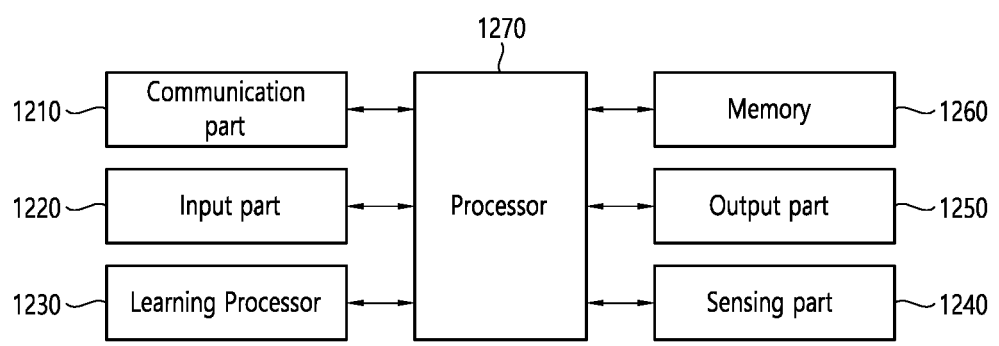
FIG. 12 shows an example of an AI device to which the technical features of the present disclosure can be applied.

FIG. 12 shows an example of an AI device to which the technical features of the present disclosure can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display unit for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
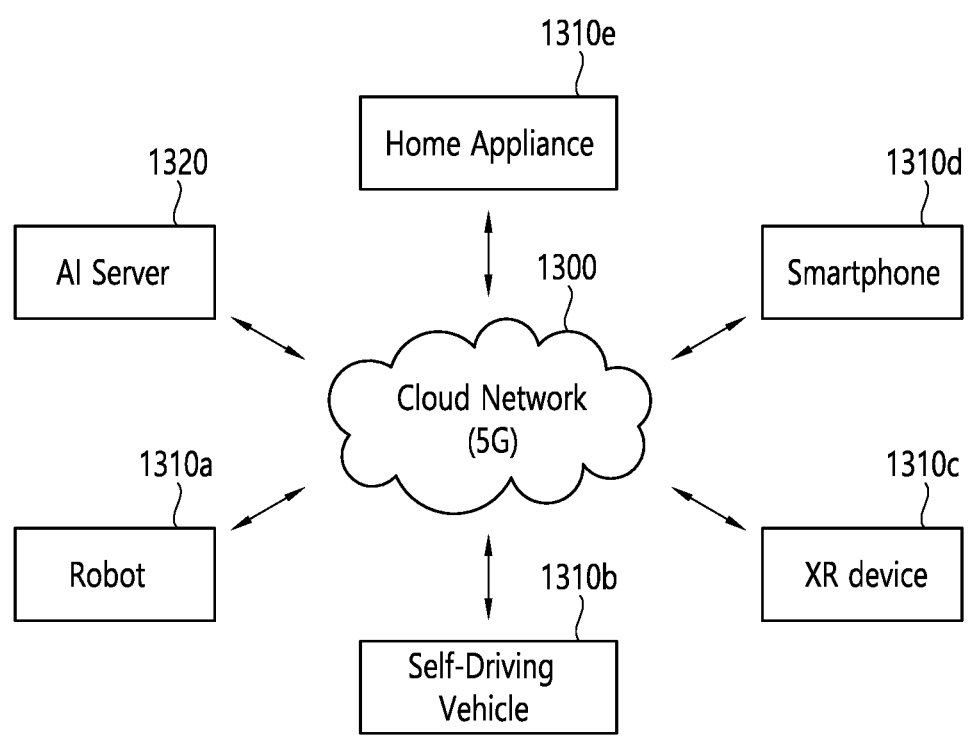
FIG. 13 shows an example of an AI system to which the technical features of the present disclosure can be applied.

FIG. 13 shows an example of an AI system to which the technical features of the present disclosure can be applied.

Referring to FIG. 13, in the AI system, at least one of an AI server 1320, a robot 1310a, an autonomous vehicle 1310b, an XR device 1310c, a smartphone 1310d and/or a home appliance 1310e is connected to a cloud network 1300. The robot 1310a, the autonomous vehicle 1310b, the XR device 1310c, the smartphone 1310d, and/or the home appliance 1310e to which the AI technology is applied may be referred to as AI devices 1310a to 1310e.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310a to 1310e and 1320 consisting the AI system may be connected to each other through the cloud network 1300. In particular, each of the devices 1310a to 1310e and 1320 may communicate with each other through a base station, but may directly communicate with each other without using a base station.

The AI server 1320 may include a server for performing AI processing and a server for performing operations on big data. The AI server 1320 is connected to at least one or more of AI devices constituting the AI system, i.e., the robot 1310a, the autonomous vehicle 1310b, the XR device 1310c, the smartphone 1310d and/or the home appliance 1310e through the cloud network 1300, and may assist at least some AI processing of the connected AI devices 1310a to 1310e. The AI server 1320 can learn the ANN according to the machine learning algorithm on behalf of the AI devices 1310a to 1310e, and can directly store the learning models and/or transmit them to the AI devices 1310a to 1310e. The AI server 1320 may receive the input data from the AI devices 1310a to 1310e, infer the result value with respect to the received input data using the learning model, generate a response and/or a control command based on the inferred result value, and transmit the generated data to the AI devices 1310a to 1310e. Alternatively, the AI devices 1310a to 1310e may directly infer a result value for the input data using a learning model, and generate a response and/or a control command based on the inferred result value.

Various embodiments of the AI devices 1310a to 1310e to which the technical features of the present disclosure can be applied will be described. The AI devices 1310a to 1310e shown in FIG. 13 can be seen as specific embodiments of the AI device 1200 shown in FIG. 12.

The present disclosure can have various advantageous effects.

For example, when radio resources are classified according to whether HARQ feedback is configured or not, and data is to be transmitted towards multiple destinations, an appropriate destination can be selected and data can be transmitted within a limited resource.

For example, a UE performing HARQ operation by using the highest priority of the selected logical channels can properly enable or disable HARQ feedback for transmissions of the packet by considering logical channel configuration.

For example, a UE performing HARQ operation can perform logical channel prioritization when different logical channels are configured with and/or without HARQ feedback.

For example, the system can provide HARQ feedback for data transmissions for a UE performing HARQ operation.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device configured to operate in a wireless communication system, the method comprising:
    selecting a destination, among multiple destinations, having a first logical channel with a highest priority among multiple logical channels,
    wherein the multiple logical channels satisfy conditions including i) data being available for transmission, and ii) a hybrid automatic repeat request (HARQ) feedback being disabled, based on the HARQ feedback not being configured for a sidelink grant;
    selecting one or more logical channels including the first logical channel for which the HARQ feedback is disabled among the multiple logical channels for the selected destination, based on the HARQ feedback not being configured for the sidelink grant;
    allocating resources to the one or more logical channels based on the sidelink grant;
    multiplexing media access control (MAC) service data units (SDUs) in a MAC protocol data unit (PDU); and
    transmitting, to a second wireless device, the MAC PDU.

2. The method of claim 1, wherein the first logical channel with the highest priority is selected for the selected destination.

3. The method of claim 1, wherein a cast type associated with the destination is selected from among unicast, groupcast and/or broadcast.

4. The method of claim 1, wherein the one or more logical channels are associated with a sidelink radio bearer (SLRB).

5. The method of claim 1, wherein a HARQ feedback resource is requested to a network.

6. The method of claim 1, wherein the MAC PDU is re-transmitted to the second wireless device without reception of the HARQ feedback from the second wireless device.

7. The method of claim 1, wherein the first wireless device is in communication with at least one of a mobile device, a network, and/or autonomous vehicles other than the first wireless device.

8. A first wireless device configured to operate in a wireless communication system, the first wireless device comprising:
    at least one transceiver;
    at least one processor; and
    at least one computer memory operably connectable to the at least one processor and storing instructions that, based on being executed by the at least one processor, perform operations comprising:
    selecting a destination, among multiple destinations, having a first logical channel with a highest priority among multiple logical channels,
    wherein the multiple logical channels satisfy conditions including i) data being available for transmission, and ii) a hybrid automatic repeat request (HARQ) feedback being disabled, based on the HARQ feedback not being configured for a sidelink grant;
    selecting one or more logical channels including the first logical channel for which the HARQ feedback is disabled among the multiple logical channels for the selected destination, based on the HARQ feedback not being configured for the sidelink grant;
    allocating resources to the one or more logical channels based on the sidelink grant;
    multiplexing media access control (MAC) service data units (SDUs) in a MAC protocol data unit (PDU); and
    transmitting, to a second wireless device, the MAC PDU.

9. The first wireless device of claim 8, wherein the first logical channel with the highest priority is selected for the selected destination.

10. The first wireless device of claim 8, wherein a cast type associated with the destination is selected from among unicast, groupcast and/or broadcast.

11. The first wireless device of claim 8, wherein the one or more logical channels are associated with a sidelink radio bearer (SLRB).

12. The first wireless device of claim 8, wherein a HARQ feedback resource is requested to a network.

13. The first wireless device of claim 8, wherein the MAC PDU is re-transmitted to the second wireless device without reception of the HARQ feedback from the second wireless device.

14. A processing apparatus configured to control a wireless device in a wireless communication system, the processing apparatus comprising:
- at least one processor; and
- at least one computer memory operably connectable to the at least one processor, wherein the at least one processor is configured to perform operations comprising:
- selecting a destination, among multiple destinations, having a first logical channel with a highest priority among multiple logical channels,
- wherein the multiple logical channels satisfy conditions including i) data being available for transmission, and ii) a hybrid automatic repeat request (HARQ) feedback being disabled, based on the HARQ feedback not being configured for a sidelink grant;
- selecting one or more logical channels including the first logical channel for which the HARQ feedback is disabled among the multiple logical channels for the selected destination, based on the HARQ feedback not being configured for the sidelink grant; and
- allocating resources to the one or more logical channels based on the sidelink grant.

* * * * *